United States Patent [19]

Nomura et al.

[11] 4,184,812

[45] Jan. 22, 1980

[54] EXHAUST GAS TURBINE SUPERCHARGER

[75] Inventors: Jiro Nomura; Hiroshi Nakatomi; Yoshikatsu Yuasa, all of Nagasaki, Japan

[73] Assignee: Mitsubishi Jukogyo Kabushiki Kaisha, Tokyo, Japan

[21] Appl. No.: 821,313

[22] Filed: Aug. 2, 1977

[30] Foreign Application Priority Data

Aug. 3, 1976 [JP] Japan ............................ 51-92045

[51] Int. Cl.² ...................... F04B 35/00; F01D 25/24
[52] U.S. Cl. ............................... 417/407; 417/409; 415/219 R
[58] Field of Search .......... 415/118, 196, 202, 219 R, 415/219 C, 219 B; 417/407, 408, 409; 60/605

[56] References Cited

U.S. PATENT DOCUMENTS

| | | | |
|---|---|---|---|
| 2,646,210 | 7/1953 | Kohlmann et al. | 417/407 |
| 3,303,994 | 2/1967 | Morooka | 417/407 |

FOREIGN PATENT DOCUMENTS

| | | | |
|---|---|---|---|
| 970089 | 8/1958 | Fed. Rep. of Germany | 417/407 |
| 2407855 | 10/1974 | Fed. Rep. of Germany | 417/409 |
| 2416255 | 10/1974 | Fed. Rep. of Germany | 417/409 |
| 1017782 | 12/1952 | France | 417/409 |
| 1225788 | 7/1960 | France | 417/407 |
| 730870 | 6/1955 | United Kingdom | 417/407 |

*Primary Examiner*—Michael Koczo
*Attorney, Agent, or Firm*—Wenderoth, Lind & Ponack

[57] ABSTRACT

In an exhaust gas turbine supercharger, a gas inlet casing is formed in a double cylindrical structure that can be divided into separate inner and outer cylindrical casing sections which are slidably fitted to each other in their axial direction, and a turbine nozzle is supported from the inner casing section. This improved structure of the exhaust gas turbine supercharger facilitates dismantling of the turbine nozzle for its cleaning or replacement.

1 Claim, 4 Drawing Figures

EXHAUST GAS TURBINE SUPERCHARGER

BACKGROUND OF THE INVENTION

The present invention relates to a structure of an exhaust gas turbine supercharger, and more particularly, to a structure for supporting a turbine nozzle in an exhaust gas turbine supercharger.

Heretofore known representative superchargers adapted to be equipped on a diesel engine are illustrated in cross-section in FIGS. 1 and 2. The supercharger shown in FIG. 1 is called an outside bearing type supercharger because its journal bearings 9 and 10 are disposed outside (at the opposite ends) of turbine drive blades 3 and an impeller 6 of a blower. On the other hand, the supercharger shown in FIG. 2 is called an inside bearing type supercharger because its journal bearings 9 and 10 are disposed inside of turbine blades 3 and an impeller 6 of a blower.

In operation of the supercharger, as is well-known in the art, an exhaust gas from a diesel engine enters into the supercharger through a gas inlet casing 1, and the heat energy of the exhaust gas is converted into kinetic energy by means of a turbine nozzle 2 to apply a torque to turbine blades 3. The exhaust gas discharged from the turbine blades 3 is passed through a gas outlet casing 4 and is exhausted via a stack. A rotor shaft 5 driven by the turbine blades 3 drives an impeller 6 mounted at the other end of the rotor shaft 5. Owing to the rotation of the impeller 6, air is sucked through an intake casing 11, is pressurized during passage through the impeller 6, is further raised in pressure by a diffuser 7, and is fed to a diesel engine through a blower casing 8.

One of the problems which arise during normal use of such superchargers is blocking of the exhaust gas passageway and lowering of the turbine performance which may be caused by a substance or scales adhering to the turbine nozzle 2 and the turbine blades 3. Since the turbine blades 3 are rotating generally at a very high speed, the adhesion of scale thereto is not greatly significant. However, adhesion of scale to the turbine nozzle 2 does cause a problem. This scale flows into the supercharger together with the exhaust gas from the main diesel engine, and it consists of unburned carbon and inorganic salts. The scale normally adheres very rigidly and cannot be readily removed. In order to perfectly remove the scale adhered onto the turbine nozzle 2, the turbine nozzle 2 must be dismantled from the supercharger and then the scale is removed from the nozzle (as by a wire brush after boiling).

The disadvantage of prior art superchargers is that the dismantling operation of the turbine nozzle was very troublesome.

More particularly, in the case of the outside bearing type supercharger illustrated in FIG. 1, in order to dismantle the turbine nozzle 2, the gas inlet casing 1 must be removed. For removing the gas inlet casing 1, the coupling bolts between the exhaust pipe of the main diesel engine and the gas inlet casing 1, as well as the bolts 12, must be removed, and also upon extracting the casing 1 the rotor shaft 5 must be supported so that it will not fall down. Although the turbine nozzle 2 can be dismantled through the above-mentioned process from a theoretical basis, normally the bolts on the exhaust gas side are not removable because of seizure, so that in practice the intake casing 11 is at first removed, and after the casings have been dismantled successively from the blower side and the rotor shaft 5 has been extracted from the blower side, the nozzle fixing bolts 13 are removed and then the turbine nozzle 2 is taken out. In any case, such a dismantling operation becomes a large-scaled operation.

Likewise, in order to dismantle the turbine nozzle 2 in the inside bearing type supercharger illustrated in FIG. 2, after the intake casing 11 has been removed and the casings on the blower side have been removed, the impeller 6 is dismantled. After the journal bearings 9 and 10 have been removed, a gas outlet casing cover 21 is removed and then the rotor shaft 5 is extracted to the exhaust gas side. Subsequently, bolts 23 are removed and the turbine nozzle 2 is taken out.

Though it is desirable to frequently clean the turbine nozzle 2, due to the fact that the operation of dismantling the turbine nozzle 2 is troublesome and laborious as described above, normally it is not dismantled for a period of about one year. During such period, the efficiency of the turbine is lowered and the amount of air supplied to the main diesel engine is reduced. Consequently, adverse effects such as, for example, a rise in the exhaust gas temperature are affected upon the main diesel engine.

On the other hand, under the world wide tendency for energy savings, the nature of the fuel oil for the main diesel engine is increasingly degraded, combustion residuals flow more and more into the supercharger jointly with the exhaust gas, and thereby the tendency of adhesion and accumulation of the residuals on the turbine nozzle is increasing. Under such circumstances, the requirement for the laborious work as described above upon dismantling of the turbine nozzle presents a substantial problem to the user of a diesel engine.

SUMMARY OF THE INVENTION

Therefore, it is one object of the present invention to provide a novel structure of an exhaust gas turbine supercharger in which a turbine nozzle can be taken out in a very simple manner to obviate the aforementioned disadvantage of the prior art superchargers.

According to one feature of the present invention, there is provided an exhaust gas turbine supercharger in which a gas inlet casing is formed in a double structure that can be divided into separate inner and outer cylindrical casing sections which are slidably fitted to each other in their axial direction, and a turbine nozzle is supported from the inner casing section.

The above-featured structure of the exhaust gas turbine supercharger is more widely applicable to general gas turbines.

BRIEF DESCRIPTION OF THE DRAWINGS

The above-mentioned and other features and objects of this invention will become more apparent by reference to the following description taken in conjunction with the accompanying drawings, in which.

DETAILED DESCRIPTION OF THE INVENTION

Figure 2:
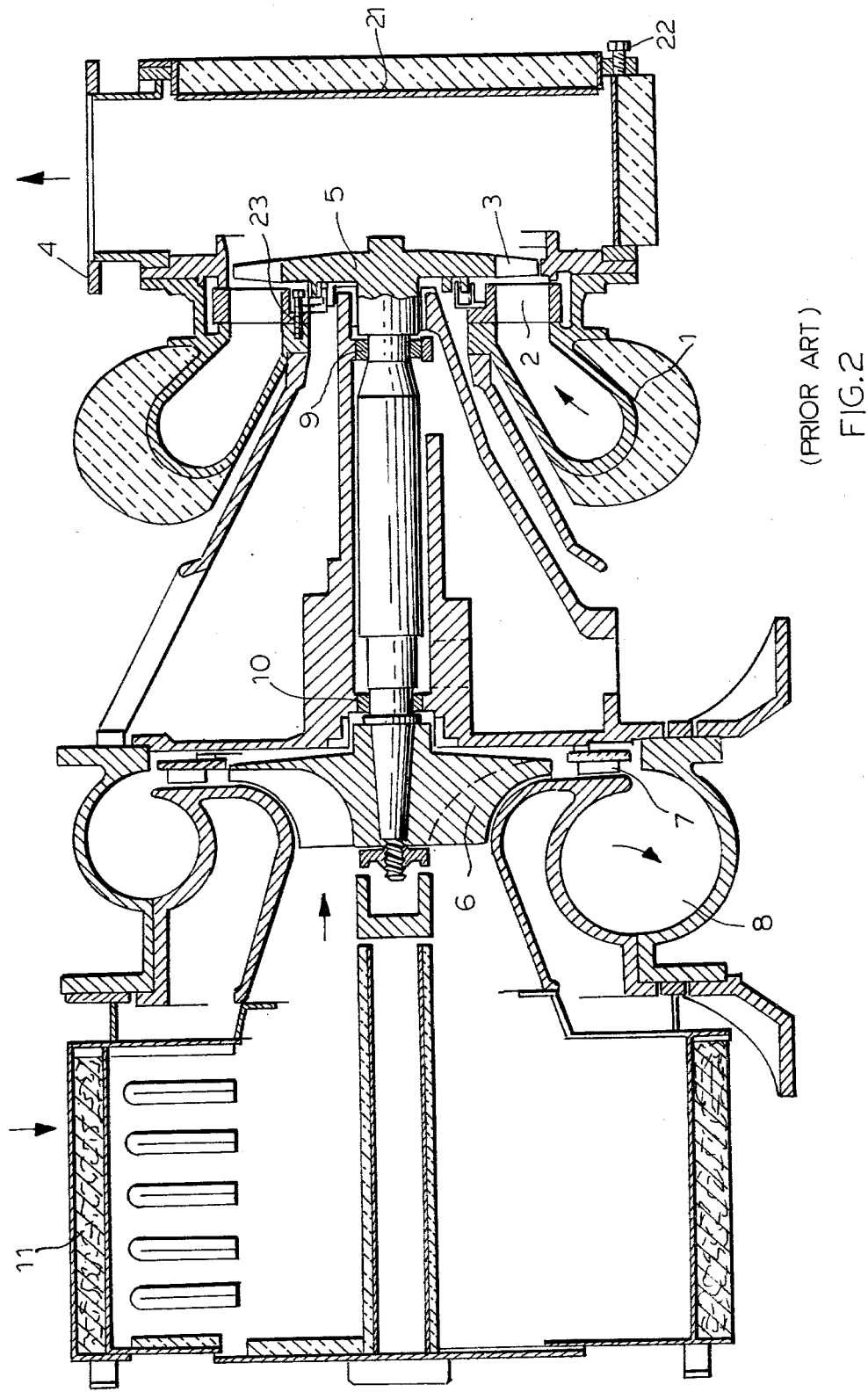
FIG. 2 is a cross-sectional view showing an inside bearing type supercharger in the prior art.
Figure 3:
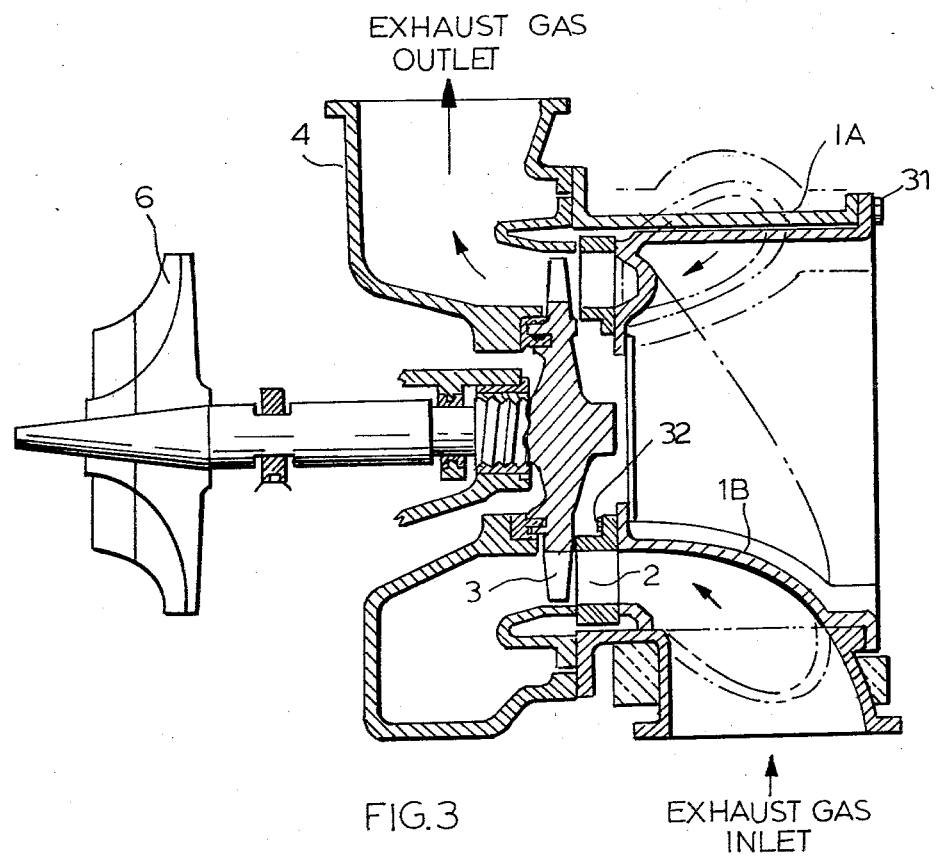
FIG. 3 is a cross-sectional view showing an essential part of an inside bearing type supercharger according to one preferred embodiment of the present invention.

Referring now to the accompanying drawings, an essential part of an inside bearing type supercharger according to one preferred embodiment of the present invention is shown in cross-section in FIG. 3. In order to achieve the aforementioned object of the present invention, in the structure of the inside bearing type supercharger illustrated in FIG. 3 the direction of the exhaust gas flow is arranged to be opposite to that in the structure of the inside bearing type supercharger according to the prior art shown in FIG. 2.

In FIG. 2, the exhaust gas flowing into the supercharger through the gas inlet casing 1 flows into the middle portion between the blower impeller 6 and the turbine blades 3, then flows rightwardly along the axial direction as viewed in the figure, and then flows out through the gas outlet casing 4 at the right end of the supercharger. On the other hand, in the supercharger according to the present invention illustrated in FIG. 3, a gas inlet casing through which the exhaust gas flows into the supercharger is disposed at the right end of the supercharger, the exhaust gas flows leftwardly along the axial direction, and then it flows out through a gas outlet casing 4 disposed in the middle portion between the blower impeller 6 and the turbine blades 3.

In the novel structure illustrated in FIG. 3, the gas inlet casing is divided into two sections, that is, into an outer gas inlet casing section 1A and an inner gas inlet casing section 1B. The outer gas inlet casing section 1A and the inner gas inlet casing section 1B are formed in a substantially cylindrical form and are slidably fitted to each other in their axial direction, and the inner gas inlet casing section 1B is fixedly secured to the outer gas inlet casing section 1A by means of bolts 31, one of which is shown in FIG. 3. A nozzle 2 is fixedly mounted to the inner gas inlet casing section 1B by means of bolts 32, also one of which is shown in FIG. 3.

The above-described novel structure of the supercharger has the following effects and advantages. That is, when it is intended to take out the nozzle 2, it is only necessary to remove the bolts 31 and then extract the inner gas inlet casing section 1B outwardly in the axial direction. The nozzle 2 is then also integrally removed with the casing section 1B.

As described above, according to the present invention there is an advantage that the nozzle 2 can be taken out externally by extracting the inner gas inlet casing section 1B. Accordingly, there is no need to extract the rotor and to remove a large number of casings and bolts.

Furthermore, since the nozzle can be taken out in a simple manner, no laborious work is necessary for maintenance of the supercharger, and since the supercharger can always be operated under the best condition for achieving the highest performance, the supercharger favorably effects the operation of the main diesel engine.

Figure 1:
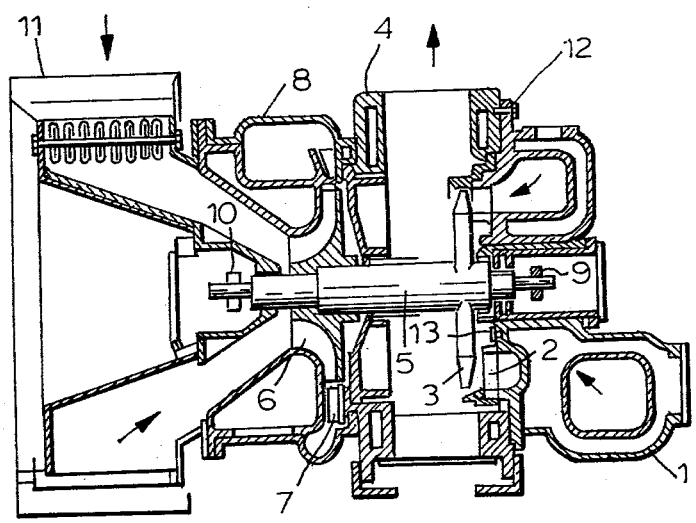
FIG. 1 is a cross-sectional view showing an outside bearing type supercharger according to the prior art.
Figure 4:
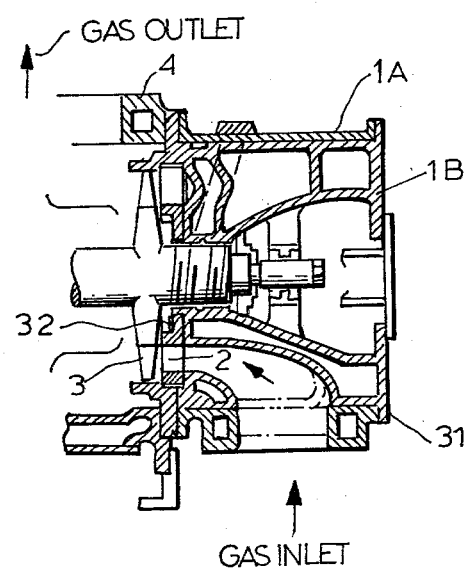
FIG. 4 is a cross-sectional view showing an essential part of an outside bearing type supercharger according to another preferred embodiment of the present invention.

Another preferred embodiment of the present invention is illustrated in FIG. 4. This preferred embodiment is an application of the present invention to the outside bearing type supercharger shown in FIG. 1, and in this preferred embodiment, the gas inlet casing is divided into two casing sections in a manner similar to the above-mentioned first preferred embodiment shown in FIG. 3, as will be self-explanatory from the illustration. Since the effects and advantages of this second preferred embodiment are exactly the same as those described above in connection with the first preferred embodiment, description thereof will be omitted.

Since many changes could be made in the above construction and many apparently widely different embodiments of this invention could be made without departing from the scope thereof, it is intended that all the matter contained in the above description or shown in the accompanying drawings shall be interpreted as illustrative and not as a limitation to the scope of the invention.

What is claimed is:

1. An axial flow gas turbine supercharger comprising:
   a rotor shaft mounted for rotation and having first and second opposite ends;
   a blower impeller fixed to said first end of said rotor shaft;
   turbine blades fixed to said second end of said rotor shaft;
   at least one turbine nozzle positioned axially adjacent said turbine blades on the side thereof facing away from said impeller;
   exhaust gas inlet casing means positioned for directing inlet exhaust gas from an engine exhaust axially through said at least one nozzle and then axially between said turbine blades, thereby rotating said turbine blades, said rotor shaft and said impeller;
   exhaust gas outlet casing means positioned axially between said turbine blades and said impeller for receiving said inlet exhaust gas after passage thereof between said turbine blades and for discharging said inlet exhaust gas; and
   said exhaust gas inlet casing means comprising a fixedly positioned cylindrical outer inlet casing and a cylindrical inner inlet casing dimensioned to be axially slidably inserted into and removed from the interior of said outer inlet casing, said outer inlet casing enclosing said inner inlet casing throughout substantially the entire axial length thereof, said outer inlet casing including means for connection to an engine exhaust pipe, said inner inlet casing being free of direct connection to the engine exhaust pipe, means for attaching said at least one turbine nozzle to the axially inner end of said inner inlet casing, and means for connecting said inner and outer inlet casings when said inner inlet casing is axially inserted into said outer inlet casing, whereby said at least one turbine nozzle may be disassembled from said supercharger by removing said connecting means and then axially removing as a unit said inner inlet casing and said at least one turbine nozzle from the interior of said outer inlet casing, without disconnecting said outer inlet casing from the engine exhaust pipe.

* * * * *